(12) United States Patent
Sun et al.

(10) Patent No.: US 8,611,260 B2
(45) Date of Patent: Dec. 17, 2013

(54) SYSTEMS AND METHODS FOR DISTANCE ESTIMATION BETWEEN ELECTRONIC DEVICES

(75) Inventors: Yan Sun, Wakefield, RI (US); Qing Yang, Saunderstown, RI (US); Weijun Xiao, Kingston, RI (US); Yinan Liu, Kingston, RI (US)

(73) Assignee: Board of Governors for Higher Education, State of Rhode Island and Providence Plantations, Providence, RI (US)

(*) Notice: Subject to any disclaimer, the term of this patent is extended or adjusted under 35 U.S.C. 154(b) by 370 days.

(21) Appl. No.: 12/751,338

(22) Filed: Mar. 31, 2010

(65) Prior Publication Data
US 2011/0170430 A1    Jul. 14, 2011

Related U.S. Application Data

(63) Continuation of application No. 12/207,923, filed on Sep. 10, 2008, now abandoned, which is a continuation of application No. PCT/US2007/064258, filed on Mar. 19, 2007.

(60) Provisional application No. 60/786,439, filed on Mar. 28, 2006.

(51) Int. Cl.
*H04B 7/005* (2006.01)

(52) U.S. Cl.
USPC .......................................................... 370/278

(58) Field of Classification Search
None
See application file for complete search history.

(56) References Cited

U.S. PATENT DOCUMENTS

| | | | |
|---|---|---|---|
| 2,543,782 A | 3/1951 | Kiebert | |
| 5,710,981 A | 1/1998 | Kim | |
| 6,018,544 A * | 1/2000 | Kotzin et al. | 375/148 |
| 6,567,670 B1 | 5/2003 | Petersson | |
| 7,358,899 B1 * | 4/2008 | Ville et al. | 342/458 |
| 2006/0063522 A1 | 3/2006 | McFarland | |
| 2007/0258383 A1 * | 11/2007 | Wada | 370/252 |
| 2008/0095247 A1 * | 4/2008 | Ohno et al. | 375/240.28 |

* cited by examiner

*Primary Examiner* — Raj Jain
(74) *Attorney, Agent, or Firm* — Gesmer Updegrove LLP

(57) ABSTRACT

A distance estimation system is disclosed for estimating a distance between two electronic devices. The system includes a power adjustable transmitter that is capable of having its power level adjusted between successive transmissions of packets of data, a remote device that is remote from the power adjustable transmitter for receiving the packets of data, and a distance estimation unit. The distance estimation unit is for generating a distance estimation signal responsive to the packets of data received at the remote device such that the distance estimation signal is associated with a power level at which the power level adjustable transmitter is not able to sufficiently transmit the packets of data to the remote device.

20 Claims, 3 Drawing Sheets

SYSTEMS AND METHODS FOR DISTANCE ESTIMATION BETWEEN ELECTRONIC DEVICES

PRIORITY

This application is a continuation of U.S. patent application Ser. No. 12/207,923 filed on Sep. 10, 2008, which is a continuation of International Patent Application No. PCT/US2007/064258, filed on Mar. 19, 2007, which claims priority to U.S. Provisional Patent Application 60/786,439 filed on Mar. 28, 2006, all of which are incorporated herein by reference in their entirety.

BACKGROUND

The invention generally relates to systems and methods for determining or estimating the distance between objects, and relates in particular to systems and methods for estimating the distance between objects that include digital electronics.

Many systems and methods have been developed for estimating the distance between electronic devices. For example, a received-signal-strength-indication (RSSI) method of estimating the distance between two communicating analog electronic devices employs measuring the strength of the received signals. The power of a radio signal for example, falls off exponentially with distance, and the receiver can measure this attenuation in order to estimate the distance to the sender. This cannot be applied directly to digital devices however, without significant change to the hardware, in part, because noise and interference easily affect the measured results.

Another method for estimating the distance between devices includes using sonic transceivers, but the use of sonic transceivers also increases hardware costs as well as power consumption. Global position systems (GPS) may also be used to determine distance, but such systems also increase hardware cost.

A further type of distance determining system relies on a pre-deployed sensor network. The distance between the device and pre-deployed sensors are estimated first, and the sensor network calculates the location of the device. Again, such a system increases hardware cost.

Conventional systems for estimating the distance between two wireless communication devices include time-of-arrival (ToA) and angle-of-arrival (AoA). The ToA method is based on the speed of radio wave propagation and the measured time it takes for a radio signal to move between two objects. Combining this information allows the ToA system to estimate the distance between sender and receiver. ToA offers high levels of accuracy, but also requires relatively fast processing capabilities to resolve timing differences for fine measurements. This problem is amplified over short distances, making ToA a poor choice for a ranging technique for positioning in wireless, ad-hoc sensing networks. ToA measurements may be combined with acoustic measurements to achieve accuracy of a few percent of the transmission range. Acoustic signals, however, are temperature dependent, require unobstructed line-of-sight, are reliant on directionality, and require additional hardware.

The AoA techniques make use of antenna arrays to measure the angle at which a signal arrives. Angles can be combined with distance estimates or other angle measurements to derive positions, but this requires multiple antennas that may be located far apart, which also increases hardware cost of the devices. A major disadvantage of the AoA techniques is the hardware requirement. The antenna arrays are expensive to be implemented and maintained, making AoA a poor choice for inexpensive applications.

There remains a need, therefore, for an efficient and cost effective system and method for providing accurate estimated distances between wireless digital electronic devices.

SUMMARY

The invention provides a distance estimation system for estimating a distance between two electronic devices. In accordance with an embodiment, the system includes a power adjustable transmitter that is capable of having its power level adjusted between successive transmissions of packets of data, a remote device that is remote from the power adjustable transmitter for receiving the packets of data, and a distance estimation unit. The distance estimation unit is for generating a distance estimation signal responsive to the packets of data received at the remote device such that the distance estimation signal is associated with a power level at which the power level adjustable transmitter is not able to sufficiently transmit the packets of data to the remote device.

In accordance with another embodiment, the invention provides a distance estimation system that includes a first transmitter associated with a first device, a first receiver associated with a second device, a second transmitter associated with the second device, a second receiver associated with the first device, and a distance estimation unit. The first transmitter associated with the first device receives power from an adjustable power source, and is for transmitting packets of data at a plurality of power levels. The first receiver associated with the second device receives transmitted packets of data from the first transmitter. The second transmitter associated with the second device transmits evaluation signals responsive to the transmitted packets of data received by the second device. The second receiver associated with the first device receives the evaluation signals. The distance estimation unit is coupled to the second receiver for estimating the distance between the first and second devices responsive to the evaluation signals from the second receiver.

In accordance with a further embodiment, the invention provides a method of estimating the distance between two electronic devices that includes the steps of transmitting a plurality of packets of data from a first device, each packet of data being transmitted at a different transmission power level; receiving the plurality of packets of data at a receiver at a second device; transmitting estimation signals from the second device to the first device; receiving the estimation signals from the second device; and estimating the distance between the first and second devices responsive to the estimation signals received from the second receiver and associated with a final transmission power level. The final transmission power level is associated with a packet of data received from the second device that is associated with a transmission power level that is insufficient for transmission of data from the first device to the second device.

BRIEF DESCRIPTION OF THE DRAWINGS

The following description may be further understood with reference to the accompanying drawings in which.

The drawings are shown for illustrative purposes only.

DETAILED DESCRIPTION

As wireless digital electronic devices have become ubiquitous, manufactures of such devices continue to seek ways of reducing the size and cost of the devices while increasing their functionality. One desired functional feature of such devices is a technique for estimating the distance between two wireless devices without significant increase in cost or size of the devices.

The invention provides a cost-effective system and method, referred to herein as Transmission Error Approximation (TEA), for estimating the distance between two wireless devices using commodity hardware components. Without requiring additional special hardware, the method uses the existing network layer protocol (SMAC) between two communication devices. The method makes use of the power management module on the master control unit (MCU) of a wireless device, such as a device that conforms to the ZIGBEE® standard as promulgated by the ZigBee Alliance Corporation of San Ramon, Calif. By configuring and tuning of the power management functions, a sequence of packets of different sizes is transmitted through a network. Statistical analysis is then performed on packet loss rates (PLR). Based on the analysis, the distance between two devices may be approximately measured. Desired actions may then be triggered depending on different applications such as pet leash, wireless child safety device, patient monitoring, etc.

Figure 1:
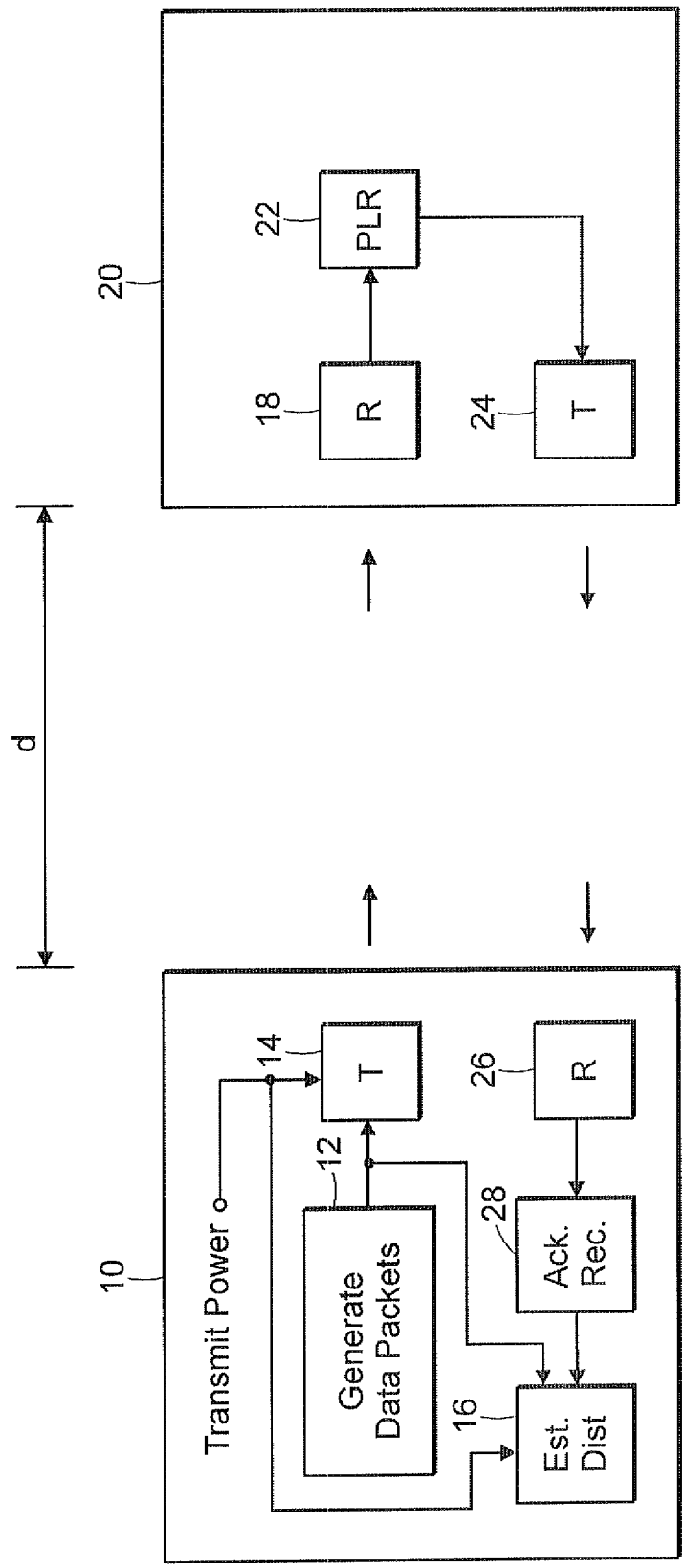
FIG. 1 shows a pair of wireless digital electronic devices in accordance with an embodiment of the invention.

FIG. 1 shows a system in accordance with an embodiment of the invention in which a first device 10 includes a data packet generation unit 12 that generates the data packets and provides them to a transmitter 14 and to a distance estimator unit 16. The transmitter 14 also receives a power signal from an adjustable power supply input. The device 10 transmits the data packets, and they are received by a receiver unit 18 of a second device 20 that is separated from the first device by an unknown distance d as shown. Information representative of the received data packets is then provided to a packet-to-loss ratio unit 22, which in turn provides data to a transmit unit 24. The transmit unit 24 sends a signal that is received by a receiver unit 26 of the device 10, which provides the data to an acknowledgement received check unit 28, which in turn communicates with the distance estimating unit 16.

During use, the data packet generation unit 12 sends packets of data to the transmitter 14 as well as to the distance estimation unit 16. The transmitter 14 sends each data packet using a power level that is initially either relatively high power or full power. Each successive transmission is then sent at a lower transmission power. All other units and components are powered at the normal power level. The receiver unit 18 of the second device 20 receives each data packet, and then generates a packet-to-loss ratio at the packet-to-loss ratio unit 22. The packet-to-loss ratio may be generated by knowing how many packets of data were sent by the transmitter. The transmitter 24 then transmits the packet-to-loss ratio data back toward the receiver unit 26 of the first device (using full power). The acknowledgment unit 28 receives each acknowledgment signal from the second device, and provides acknowledgment information to the distance estimation unit 16.

As the transmit power to the transmit unit 14 of the first device 10 is decreased, at some point, the power becomes insufficient to transmit the associated data packet, causing the packet-to-loss ration to decrease. The distance estimation unit 16 may receive the transmit power as an input and identify a distance associated with the transmit power of the latest data packet to be received, or associated with the transmit power of the nest data packet that was sent but not received. In other embodiments, the data packets themselves may include data that is representative of either the transmit power of each respective data packet or that is otherwise representative of a distance that will be associated with each data packet.

An experimental prototype has been implemented for measuring the approximate distance between two communication nodes using the ZIGBEE® protocol. Measurement results show that TEA is a cost-effective way of distance estimation and provides much better resolution than other methods based on signal strength when the distance is greater than 60 feet. Experiments have shown that measurement methods of the invention may measure the distance using commonly available devices, and that such methods provide higher resolution than distance measurement systems that rely on signal strength alone as an indication of distance.

The use of signal attenuation may be employed as a distance measurement as follows. Let d denote the distance between the host device and the remote device, $P_t$ denote the transmission power and $P_r$ denote the received signal power. Then, $$P_r = \frac{P_t}{d^\alpha} \tag{1}$$

where α is a constant between about 2 to about 4, depending on the wireless channel condition. When the transmitter sends pilot signals using a fixed transmission power, the receiver can obtain signal attenuation, defined as $P_t/P_r$, and therefore estimate the distance d.

Although the RSSI method discussed above is simple, it cannot achieve high accuracy for three reasons. First, since $P_r$ can change rapidly due to the variation of wireless channel, mobility and moving obstacles on the transmission path, it is difficult to estimate $P_r$ accurately. Second, the $P_r$ value is affected by noise and interference. When noise and/or interference are not known and not negligible, the received signal power cannot accurately represents the distance. Third, equation (1) indicates that a small estimation error in $P_r$ can result in a large error in distance estimation, especially when the distance is large. This can be verified by the following derivation.

$$P_r = \frac{P_t}{d^\alpha};$$

$$\Delta P_r = -\frac{\alpha P_t}{d^{\alpha+1}} \Delta d;$$

$$\Delta d = -\frac{d^{\alpha+1}}{\alpha P_t}\Delta P_r;$$

where $\Delta d$ and $\Delta P_r$ represent distance change and received power change respectively.

The TEA methodology of the invention is designed and implemented at network layer above the Medium Access Physical (MAC/PHY) in a ZIGBEE® compliant device without any hardware changes to the device. Instead, existing features of the transmitter/receiver hardware are employed. In particular, a special packet transmission protocol is implemented by varying the power level of the MCU. Many embedded MCUs have a power management module for the purpose of power savings. An optimal packet size and number of packets for transmission at the calibration stage are selected depending on the wireless channel to be used. During normal operation, a sequence of packets with predetermined length is transmitted from the transmitter. The receiver will calculate the packet loss rate based on the packet ID received and the predefined protocol at the calibration stage. The result of the calculation is sent to the transmitter in an acknowledgement packet using the maximum transmission power level. Based on the packet loss rate, the approximate distance between the transmitter and receiver may be estimated. Generally, the TEA method contains the following two steps in accordance with an embodiment that involves the generation of packet to loss ratios:

Step 1: the receiver estimates packet loss ratio and provides this feedback information to the transmitter. In particular, the transmitter sends a sequence of data packets to the receiver. Each data packet has a packet ID. For example, the first data packet has ID x, the second data packet has ID x+1, the third data packet has ID x+2, and so on. These data packets are transmitted with different transmission power levels. For a ZIGBEE® compliant device that is implementation by FreeScale, there are 16 transmission power levels, denoted by $P_1$, $P_2, \ldots, P_{16}$. Assume that total N packets are transmitted. Among these N packets, $q_i$ percent of packets are transmitted using transmission power $P_i$. The vector $q=[q_1, q_2, \ldots, q_{16}]$ is referred to as packet distribution.

The host device receives packets. Upon reviewing the packet IDs, it knows how many packets are lost and then obtains a packet loss ratio. The packet loss ratio should be a vector. The receiver sends the PLR back to the transmitter using the maximum transmission power.

Step 2: the transmitter estimates distance based on the PLR. When the transmission power is $P_i$ the bit error rate is a function of receiving signal-to-interference ratio and is related with the modulation scheme. In ZIGBEE® protocol, modulation scheme is Offset Quadrature Phase Shift Keying (OQPSK). The bit error rate is calculated as:

$$ber_i = \mathrm{erfc}\left(\sqrt{\frac{P_i/d^\alpha}{I}}\right), \text{ and } \mathrm{erfc}(x) = \frac{2}{\sqrt{\pi}}\int_x^\infty e^{-y^2}\,dy \quad (2)$$

where I is the noise/interference power, which may be estimated in the calibration stage.

The packet drop ratio is determined by bit error rate and the packet size. Let L denote the number of bits in each packet. Then, the packet loss ratio for each transmission power is calculated as $$PLR_i = 1-(1-ber_i)^L \quad (3)$$

The overall packet loss ratio is $$PLR = \sum_{i=1}^{16} q_i \cdot PLR_i \quad (4)$$

From equations (2)-(4), the packet loss ratio may be calculated from the distance d, given $g^i$, $P_i$ and L.

Figure 2A:
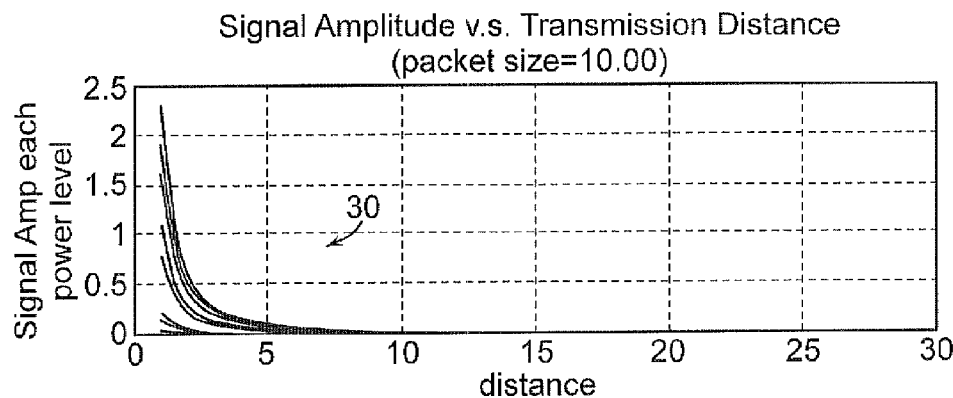
FIGS. 2A and 2B show graphical illustrations of signal amplitude as a function of distance for several signals, and of average signal amplitude as a function of distance for a system in accordance with an embodiment of the invention.
Figure 2B:
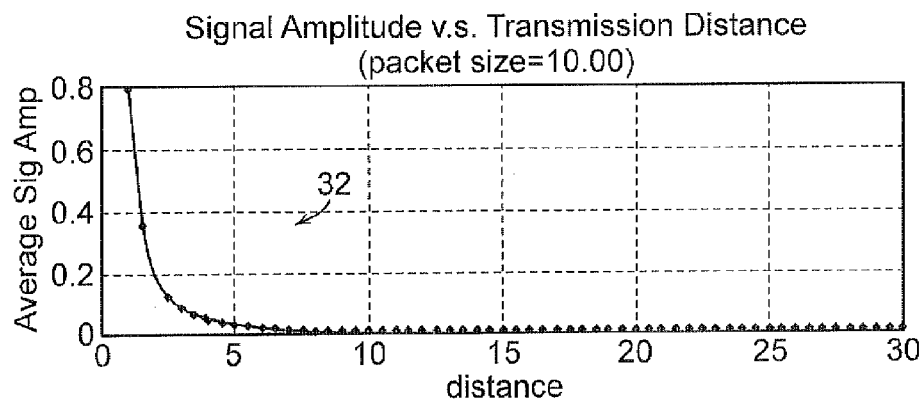

FIGS. 2A-2B and 3A-3B show signal attenuation and packet drop ratio change with distance, shown in feet. FIGS. 2A-2B show the received signal power (proportional to signal attenuation) as a function of the distance between the transmitter and the receiver. FIG. 2A shows at 30 sixteen curves, each of which is for a different transmission power. FIG. 2B shows at 32 the average of each of the above sixteen curves. It can be seen that signal attenuation alone is not a good indicator of the distance, as only short distances may be accurately measured. When the distance is large however, the signal attenuation is not sensitive to distance changes. In other words, if there is a small error in the measurement of signal attenuation, the distance estimation will suffer from a large error.

Figure 3A:
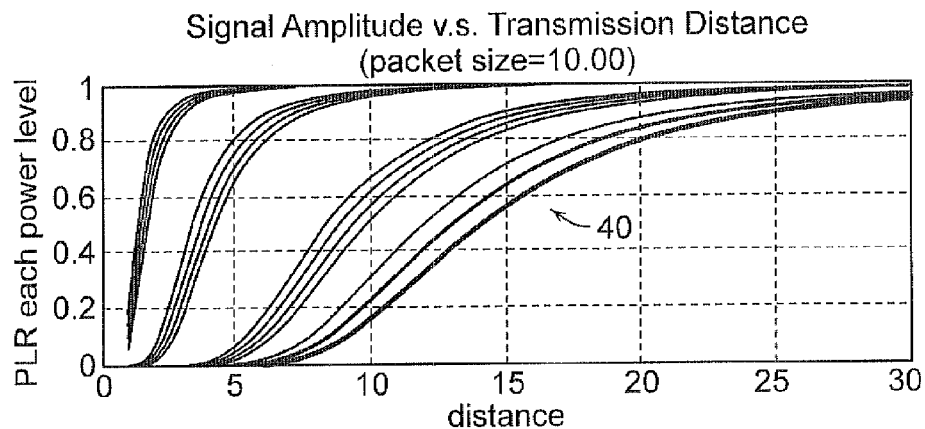
FIGS. 3A and 3B show graphical illustrations of packet loss ratio for several signals as a function of distance and of average packet loss ratio as a function of distance for a system in accordance with an embodiment of the invention.
Figure 3B:
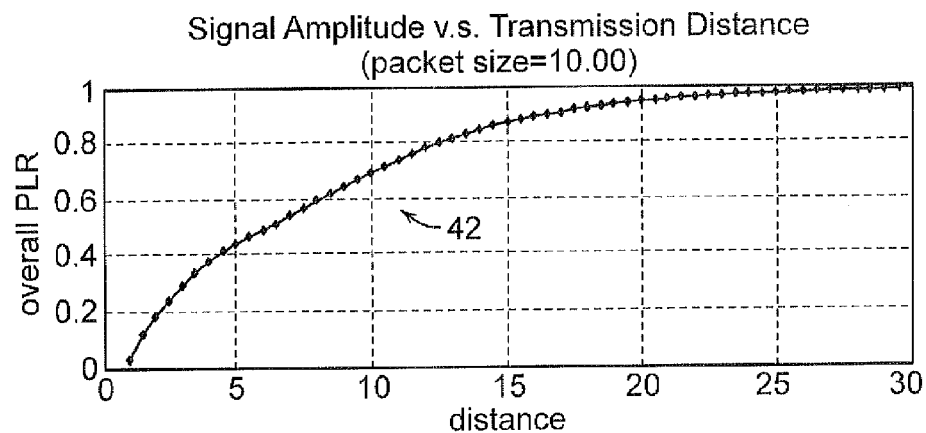

FIGS. 3A-3B show the packet loss ratio as a function of the distance. FIG. 3A shows at 40 sixteen curves, each of which is for a different transmission power. FIG. 3B shows at 42 the overall packet loss ratio (PLR). Compared with signal attenuation, PLR is approximately a linear function with the distance for a large distance range. Distance estimation based on PLR is considerably more accurate for the distances shown.

An experimental prototype was implemented on the MCF5208EVB operational platform sold by Freescale Semiconductor, Inc. of Austin, Tex. with a MC13192 transceiver as sold by Motorola, Inc. of Schaumburg, Ill. This implementation includes two wireless communication parities, transmitter and host. The embedded MC13192 transceiver is in compliance with ZigBee protocol and communicates with the main board MCF5208EVB through general purpose I/Os (GPIO)s. Use was made of the source code of ZigBee implementation from SBC tools to develop the experimental prototype. The transmitter sends 100 packets for three different packet sizes with different power levels. The host side receives packets and sends acknowledgements to the transmitter. In order to compare the TEA with RSSI, the strength of receive signal is carried in acknowledgement packet. Considering the effect of antenna direction and interferences, the transmitter was fixed and the data from the transmitter side was measured for every measurement by changing the position of host device.

Figure 4A:
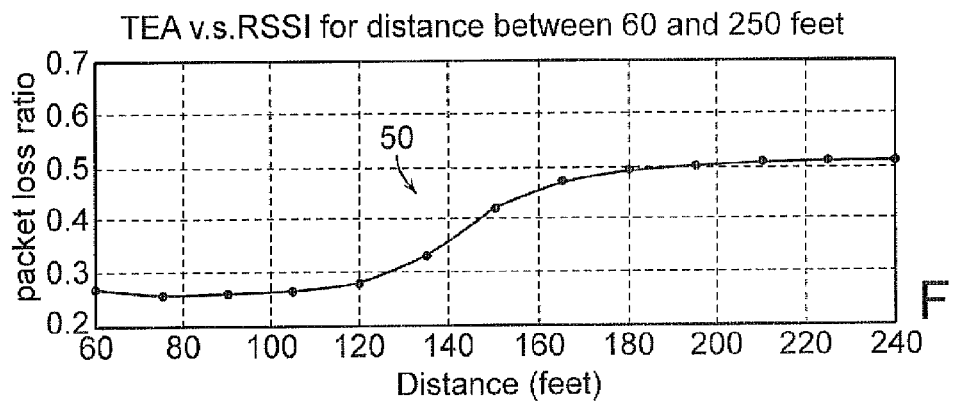
FIGS. 4A and 4B show graphical illustrations of packet loss ration for transmission error approximation in accordance with the invention for distances between 60 feet and 250 feet, and received signal strength indication in accordance with the prior art for distances between 60 feet and 250 feet.
Figure 4B:
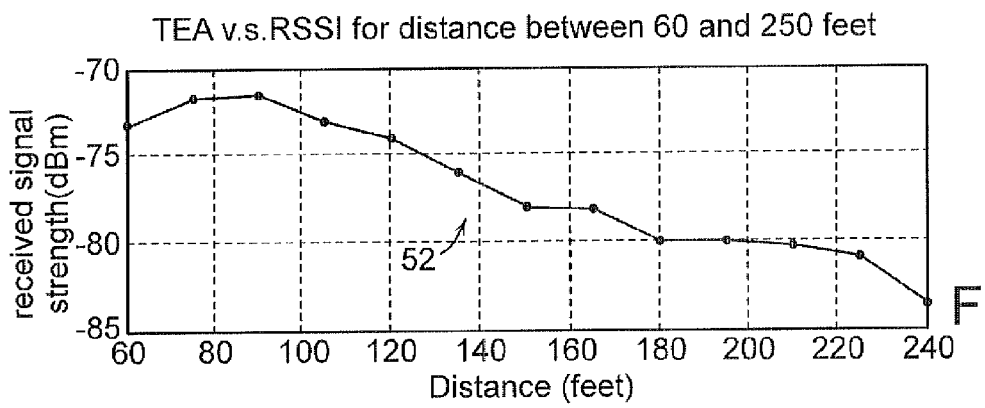

Experiments were carried out using the prototype implementation. The experiments were performed in a free space at a football field in a sunny day to minimize the interferences. The PLR and signal amplitude were measured for every 15 feet from 60 feet to 390 feet and for every 5 feet when distance is less than 60 feet. The data was analyzed for three different ranges: less than 60 feet, distance between 60 to 250 feet, and greater than 250 feet. The results for distance less than 60 feet were found to be not sufficiently accurate for measurement of distance. The packet loss ratios for distance between 60 and 250 feet are shown at 50 in FIG. 4A, and the received signal strength is shown at 52 in FIG. 4B. The above system of the invention may function, therefore, for distance estimation, but the estimation is somewhat rough and inaccurate because the power levels are not linear and are not uniformly distributed. As a result, the contributions of transmissions with different power levels are not equal. The above system however, only averaged packet loss rate associated with all different power levels to obtain an overall PLR. In other embodiments, packet loss rates may be weighted with different power levels as appropriate.

Figure 5A:
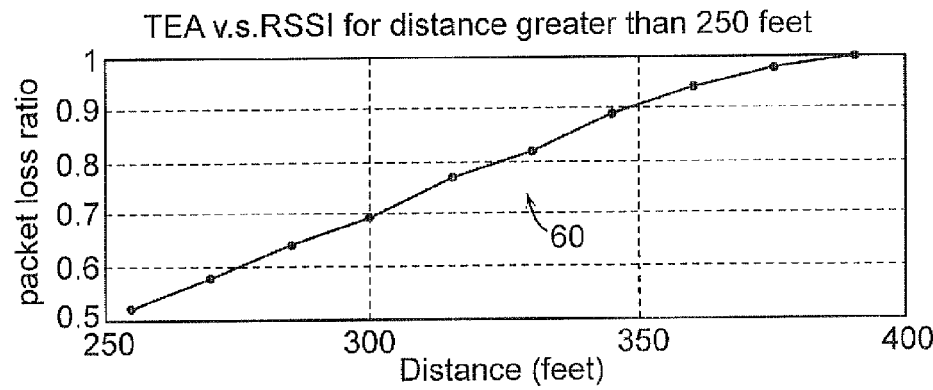
FIGS. 5A and 5B show graphical illustrations of packet loss ration for transmission error approximation in accordance with the invention for distances greater than 250 feet, and received signal strength indication in accordance with the prior art for distances greater than 250 feet.
Figure 5B:
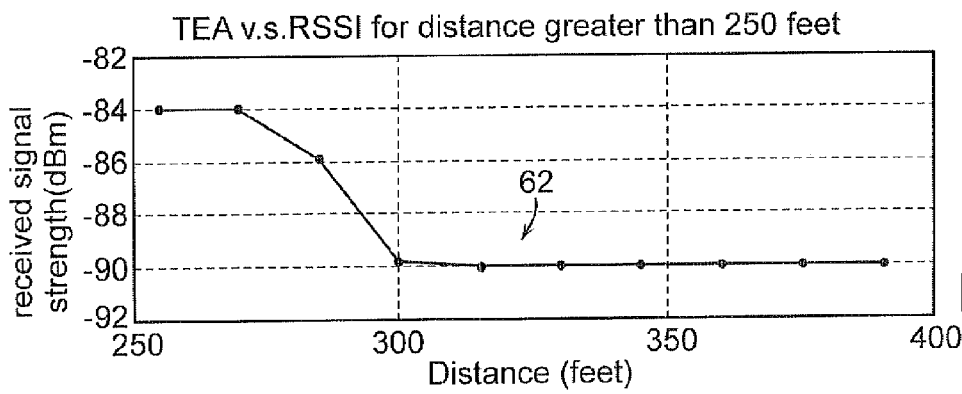

For the distance greater than 250 feet, the system of the invention works well and provides much better resolution than RSSI as shown in FIGS. 5A and 5B. When the distance is greater than 300 feet, the signal strength does not significantly attenuate as shown at 60 in FIG. 5A when compared with received signal strength alone as shown at 62 in FIG. 5B. This system of the invention, therefore, is effective up to 390 feet in distance, and the function of packet loss ratio with distance is approximately linear for this range.

In accordance with various embodiments, the invention may be used with a plurality of remote devices to which individual packets of data are effectively addressed. All remote devices may receive all data packets when the transmit power is strong, but each will look only for its own data packets and generate acknowledgment signals associated only with that remote unit. As the power decreases, each remote unit will respond accordingly as long as it receives its associated data packets. The distance estimator, therefore, will know how far each remote unit is from the central transmitter.

Theoretic analysis and practical implementation measurements, therefore, both show the methodologies of the invention may approximately estimate the distance between two wireless devices in a designed distance range. Compared to RSSI, the invention may provide much better resolution and noise tolerance.

In further embodiments, the invention may also be used as a security device. While a RSSI system may be subject to tampering by either increasing or decreased the tampered received signal, any tampering with a system of the invention may only increase the perceived distance since the introduction of physical obstacles and increased interference/noise both result in lower PLR, and therefore larger distance estimation.

Many applications employ the measurement of distance to detect events that occur then the distance between two devices larger than a threshold. For example, when the device carried by a parent and the device carried by the child is larger than a threshold, the parent is notified. When a precious item is taken out of a house, alarm is issued. In such applications, the attack that increases the distance measure is far less dangerous than the attack that can reduce the distance measure. In such applications, distance measurement of the invention is preferable because unauthorized persons may only cause false alarm but not miss detection.

The invention therefore, provides a cost-efficient method of estimating the approximate distance between two wireless communication nodes providing higher resolution than the signal attenuation method when the distance is greater than 60 feet, and significantly higher resolution up to at least 400 feet.

Those skilled in the art will appreciate that numerous modifications and variations may be made to the above disclosed embodiments without departing from the spirit and scope of the invention.

What is claimed is:

1. A distance estimation system for estimating a distance between two electronic devices, said system comprising:
   a power adjustable transmitter that is capable of having its power level adjusted between successive transmissions of packets of data, wherein said packets of data are transmitted at a plurality of different power levels;
   a remote device that is remote from the power adjustable transmitter for receiving the packets of data, wherein said remote device includes a packet-to-loss ratio unit for providing data representative of a packet-to-loss ratio of the packets of data received by the remote device, said remote device including means for determining a percentage of packets of data that are transmitted at each of the plurality of different power levels to provide a packet distribution vector; and
   distance estimation means for generating a distance estimation signal responsive to the packet distribution vector such that the distance estimation signal is associated with a power level at which the power level adjustable transmitter is not able to sufficiently transmit the packets of data to the remote device.

2. The distance estimation system as claimed in claim 1, wherein said system further includes packet generation means for generating the packets of data.

3. The distance estimation system as claimed in claim 1, wherein said packets of data include information representative of an associated power level at which each packet of data is sent.

4. The distance estimation system as claimed in claim 1, wherein said packets of data include information representative of an associated distance that is an estimated distance that a power level associated with the packet of data is expected to be able to be transmitted and successfully received by the remote device.

5. The distance estimation system as claimed in claim 1, wherein said distance estimation means is coupled to the power adjustable transmitter.

6. The distance estimation system as claimed in claim 1, wherein said system is included within a wireless monitoring system.

7. The distance estimation system as claimed in claim 1, wherein said system is included in a ZIGBEE® compliant product.

8. The distance estimation system as claimed in claim 1, wherein a packet drop ratio is determined by a bit error rate and packet size for each of the plurality of different power levels.

9. A distance estimation system for estimating a distance between two electronic devices, said system comprising:
   a first transmitter associated with a first device that receives power from an adjustable power source, said first transmitter for transmitting packets of data at a plurality of power levels;
   a first receiver associated with a second device that receives transmitted packets of data from the first transmitter, said second device including means to determine a percentage of packets of data that are transmitted at each of the plurality of power levels to provide a packet distribution vector;
   a second transmitter associated with the second device that transmits the packet distribution vector responsive to the transmitted packets of data received by the second device;
   a second receiver associated with the first device that receives the packet distribution vector from the second transmitter; and
   distance estimation means coupled to the second receiver for estimating the distance between the first and second devices responsive to the packet distribution vector, said packet distribution vector including data representative of packet-to-loss ratios for packets of data that are transmitted at each power level from the second receiver, wherein an overall packet-to-loss ratio is developed from the packet distribution vector and the packet-to-loss ratio for packets of data that are transmitted at each power level.

10. The distance estimation system as claimed in claim 9, wherein said packets of data include information representative of an associated power level at which each packet of data is sent.

11. The distance estimation system as claimed in claim 9, wherein said packets of data include information representative of an associated distance that is an estimated distance that a power level associated with the packet of data is expected to be able to be transmitted and successfully received by the second device.

12. The distance estimation system as claimed in claim 9, wherein said distance estimation means is coupled to the adjustable power source.

13. The distance estimation system as claimed in claim 9, wherein said system is included within a wireless monitoring system.

14. The distance estimation system as claimed in claim 9, wherein said system includes a third device including a third transmitter associated with the third device that transmits third device evaluation signals responsive to the transmitted packets of data received by the third device, and wherein the third device evaluation signals are different than the evaluation signals from the second device.

15. The distance estimation system as claimed in claim 9, wherein said system is effective for estimating distances of between about 250 feet to about 400 feet.

16. The distance estimation system as claimed in claim 9, wherein a packet drop ratio is determined by a bit error rate and packet size for each of the plurality of power levels.

17. A method of estimating the distance between two electronic devices, said method comprising the steps of:
  transmitting a plurality of packets of data from a first device, each packet of data being transmitted at a different transmission power level;
  receiving said plurality of packets of data at a receiver at a second device, said second device including means to determine a percentage of packets of data that are transmitted at each different power level to provide a packet distribution vector;
  transmitting the packet distribution vector from the second device to the first device responsive to the plurality of packets from the second device;
  receiving the packet distribution vector from the second device; and
  estimating the distance between the first and second devices responsive to the packet distribution vector and associated with a transmission power level associated with a packet of data received from the second device that is associated with a transmission power level that is insufficient for transmission of data from the first device to the second device.

18. The method as claimed in claim 17, wherein said method further includes the step of decreasing the transmission power level at which packets of data are transmitted.

19. The method as claimed in claim 17, wherein said method further includes the step of generating the packets of data for the method of estimating distance.

20. The method as claimed in claim 17, wherein said method is employed in a wireless monitoring device.

* * * * *